US010155474B2

(12) United States Patent
Salter et al.

(10) Patent No.: US 10,155,474 B2
(45) Date of Patent: Dec. 18, 2018

(54) RUNNING BOARD ILLUMINATION SYSTEM WITH PASSIVE MARKER LIGHT GLOW

(71) Applicant: FORD GLOBAL TECHNOLOGIES, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); James J. Surman, Clinton Township, MI (US); Terrence Joseph Wilson, Southfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 43 days.

(21) Appl. No.: 15/086,554

(22) Filed: Mar. 31, 2016

(65) Prior Publication Data
US 2017/0282787 A1    Oct. 5, 2017

(51) Int. Cl.
| F21V 1/00 | (2006.01) |
| B60Q 1/32 | (2006.01) |
| B60Q 1/00 | (2006.01) |
| B60Q 1/52 | (2006.01) |
| B60Q 1/34 | (2006.01) |
| B60Q 1/46 | (2006.01) |

(52) U.S. Cl.
CPC ............ *B60Q 1/323* (2013.01); *B60Q 1/0011* (2013.01); *B60Q 1/52* (2013.01); *B60Q 1/34* (2013.01); *B60Q 1/46* (2013.01); *B60Q 2400/20* (2013.01)

(58) Field of Classification Search
CPC .......... B60Q 1/0011; B60Q 1/34; B60Q 1/52; B60Q 1/323; B60Q 1/46; B60Q 2400/20

USPC ................................. 362/510, 511, 495, 559
See application file for complete search history.

(56) References Cited

U.S. PATENT DOCUMENTS

| 4,116,457 A | 9/1978 | Nerem et al. |
| 4,985,810 A | 1/1991 | Ramsey |
| RE34,275 E | 6/1993 | Ramsey |
| 5,915,830 A * | 6/1999 | Dickson ................. B60Q 1/323 |
| | | 362/495 |
| 6,179,454 B1 | 1/2001 | Hoines |
| 6,190,027 B1 | 2/2001 | Lekson |
| 6,244,734 B1 * | 6/2001 | Hulse ................... B60Q 1/0011 |
| | | 362/495 |

(Continued)

FOREIGN PATENT DOCUMENTS

| CA | 2282819 A1 | 3/2001 |
| CN | 202675159 U | 1/2013 |

(Continued)

OTHER PUBLICATIONS

English Machine Translation of DE102010007848A1.
English Machine Translation of CN202675159U.
English Machine Translation of JP5198906B2.

*Primary Examiner* — Karl D Frech
(74) *Attorney, Agent, or Firm* — Jason Rogers; King & Schickli, PLLC

(57) ABSTRACT

A running board illumination system is provided for a motor vehicle. That running board illumination system includes a first illumination element and an optical lens for directing light emitted by the first illumination element onto a running board of the motor vehicle. That optical lens may further include a fluorescent coating to provide a passive marker light glow when the first illumination element is extinguished.

9 Claims, 5 Drawing Sheets

(56) References Cited

U.S. PATENT DOCUMENTS

| | | |
|---|---|---|
| 6,250,785 B1 | 6/2001 | Mallia et al. |
| 6,659,629 B2 | 12/2003 | Potter et al. |
| 6,851,832 B2 | 2/2005 | Tieszen |
| 6,926,431 B1 | 8/2005 | Foote et al. |
| 7,017,927 B2 | 3/2006 | Henderson et al. |
| 7,621,546 B2 | 11/2009 | Ross et al. |
| 8,231,169 B2 | 7/2012 | Leopold |
| 8,235,568 B2 | 8/2012 | Heiden et al. |
| 8,840,143 B2 | 9/2014 | Higgins |
| 9,352,623 B2 | 5/2016 | Lynam et al. |
| 9,359,937 B2 | 6/2016 | Ichihashi |
| 9,499,092 B2 * | 11/2016 | Dellock ............... B60Q 1/2611 |
| 9,598,004 B2 | 3/2017 | Yang |
| 2004/0134114 A1 * | 7/2004 | Afshari ................. A01K 85/01 43/4.5 |
| 2008/0037266 A1 | 2/2008 | Cunnien |
| 2012/0081915 A1 | 4/2012 | Foote et al. |
| 2013/0335212 A1 | 12/2013 | Purks et al. |
| 2015/0241015 A1 | 8/2015 | Johnson et al. |
| 2016/0159274 A1 | 6/2016 | Salter et al. |
| 2017/0045204 A1 | 2/2017 | McNicol et al. |

FOREIGN PATENT DOCUMENTS

| | | |
|---|---|---|
| DE | 102010007848 A1 | 9/2010 |
| EP | 2921410 A1 | 9/2015 |
| JP | 5198906 B2 | 5/2013 |

\* cited by examiner

RUNNING BOARD ILLUMINATION SYSTEM WITH PASSIVE MARKER LIGHT GLOW

TECHNICAL FIELD

This document relates generally to the motor vehicle equipment field and, more particularly, to a running board illumination system that directs light emitted from an illumination element onto a running board during a first time frame and directs a passive marker light glow onto the running board during a second time frame.

BACKGROUND

The concept of equipping a motor vehicle, such as a pickup truck, with deployable running boards beneath the occupant entry doors and bottom side seals is known in the art. Such running boards are maintained in raised, stowed positions while the vehicle is operated at speed and displaced to lowered, deployed positions when: (1) the transmission is in the "park" position, or (2) side doors are opened so that the foot pad of the running boards may be utilized to aid individuals to enter and exit the occupant cabin of the motor vehicle.

This document relates to a new and improved running board illumination system and related method providing heretofore unseen functionality and versatility of operation as well as improved opulent, harmonious appearance making it a value added addition to the motor vehicle.

SUMMARY

In accordance with the purposes and benefits described herein, a right hand side and left hand side running board illumination system is provided for a motor vehicle. That running board illumination system comprises a first illumination element and an optical lens for directing light emitted by the first illumination element. That optical lens further includes a fluorescent coating to provide a passive marker light glow. That fluorescent coating may be an amber phosphor coating.

The running board illumination system may further include a control module configured to control the first illumination element. That control module may be configured to operate the first illumination element as a redundant turn signal. Further, that control module may be further configured to operate the first illumination element as a redundant emergency flasher. Further, that control module may be configured to operate the first illumination element as a panic mode strobe in order to direct attention to the motor vehicle. Still further, that control module may be configured to operate the first illumination element as a welcome light when an operator approaches the motor vehicle.

The first illumination element may be a light pipe. That light pipe may include a first red-green-blue light emitting diode (RGB LED) at a first end and a second RGB LED at a second end. In such an embodiment, the control module may be configured to provide lighting effects from the two RGB LEDs.

Still further the running board illumination system may further include a second illumination element. In such an embodiment the first illumination element is provided adjacent a first door of the motor vehicle while the second illumination element is provided adjacent a second door of the motor vehicle. Still further, the running board illumination system may include a third illumination element adjacent a third door of the motor vehicle and a fourth illumination element adjacent a fourth door of the motor vehicle. Where the motor vehicle is a pickup truck, the first, second, third and fourth illumination elements may be provided underneath the respective first, second, third and fourth doors of the motor vehicle and, more particularly, behind the side sills overlying the running boards provided to aid one in entering the motor vehicle through the first, second, third and fourth doors.

In accordance with an additional aspect, a method is provided of illuminating a running board of a motor vehicle. That method may be broadly described as comprising the steps of directing light emitted from a first illumination element onto the running board during a first time frame and directing a passive marker light glow onto the running board during a second time frame.

The method may further include the step of passing the light emitted from the first illumination element through a lens which directs that light from the first illumination element onto the running board. Still further the method may include providing a fluorescent coating on the lens and charging the fluorescent coating with the light emitted by the first illumination element during the first time frame. This energizes the fluorescent coating so that that fluorescent coating will emit the desired passive marker light glow during the second time frame when the first illumination element has been extinguished.

The method may further include the step of operating the first illumination element by means of the control module. More specifically, the method may include operating, by the control module, the first illumination element as a redundant turn signal, as a redundant emergency flasher, as a panic mode strobe and/or as a welcome light when an operator approaches the motor vehicle.

In the following description, there are shown and described several preferred embodiments of the running board illumination system. As it should be realized, the running board illumination system is capable of other, different embodiments and its several details are capable of modification in various, obvious aspects all without departing from the running board illumination system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the running board illumination system and together with the description serve to explain certain principles thereof. In the drawing figures.

Figure 1:
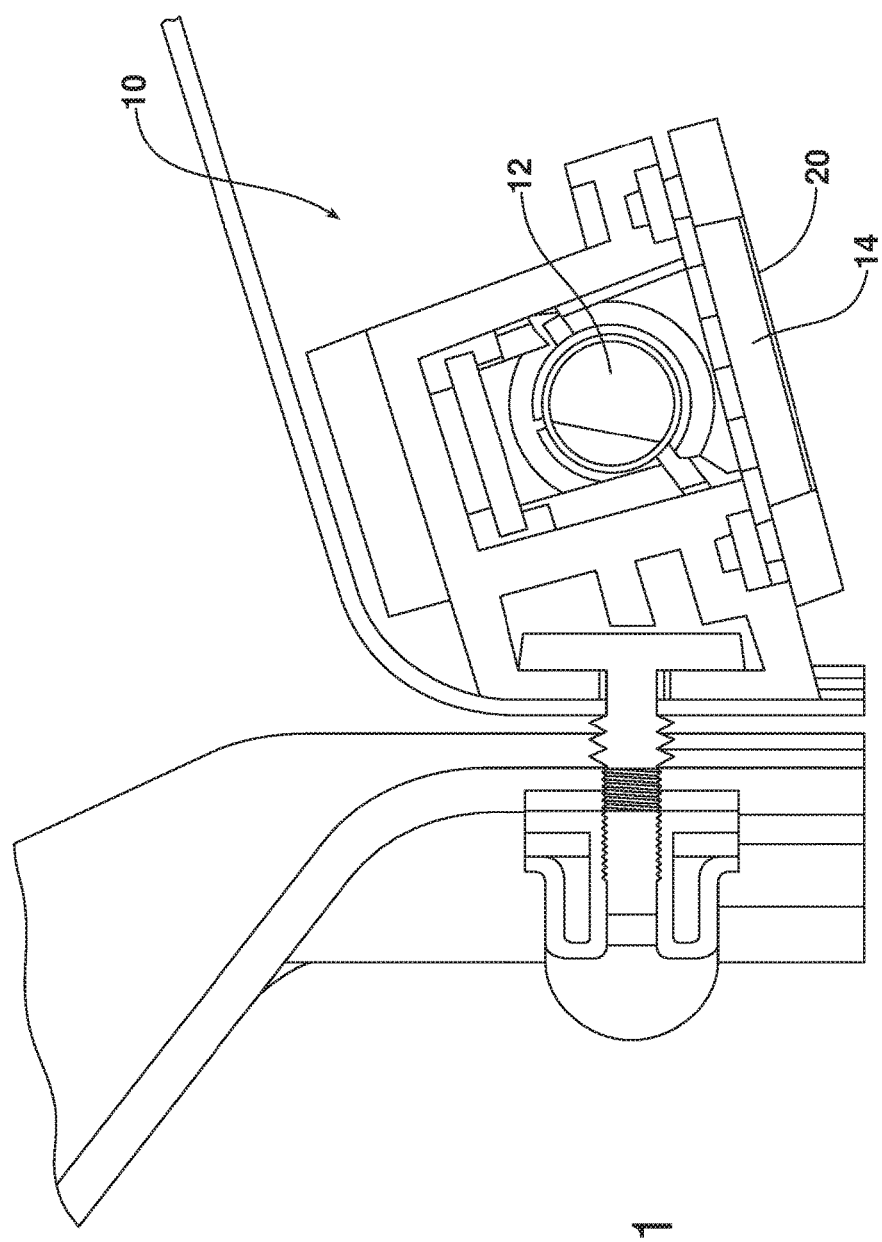
FIG. 1 is a schematic end elevational view of the first illumination element of the running board illumination system mounted to a body of the motor vehicle under the side sill.

Reference will now be made in detail to the present preferred embodiments of the running board illumination system, examples of which are illustrated in the accompanying drawing figures.

DETAILED DESCRIPTION

Reference is now made to FIGS. 1-4 illustrating a running board illumination system 10 including a first illumination element 12 and a cooperating optical lens 14 for directing light emitted by the first illumination element onto the foot pad surface 16 of a running board 18.

Figure 2:
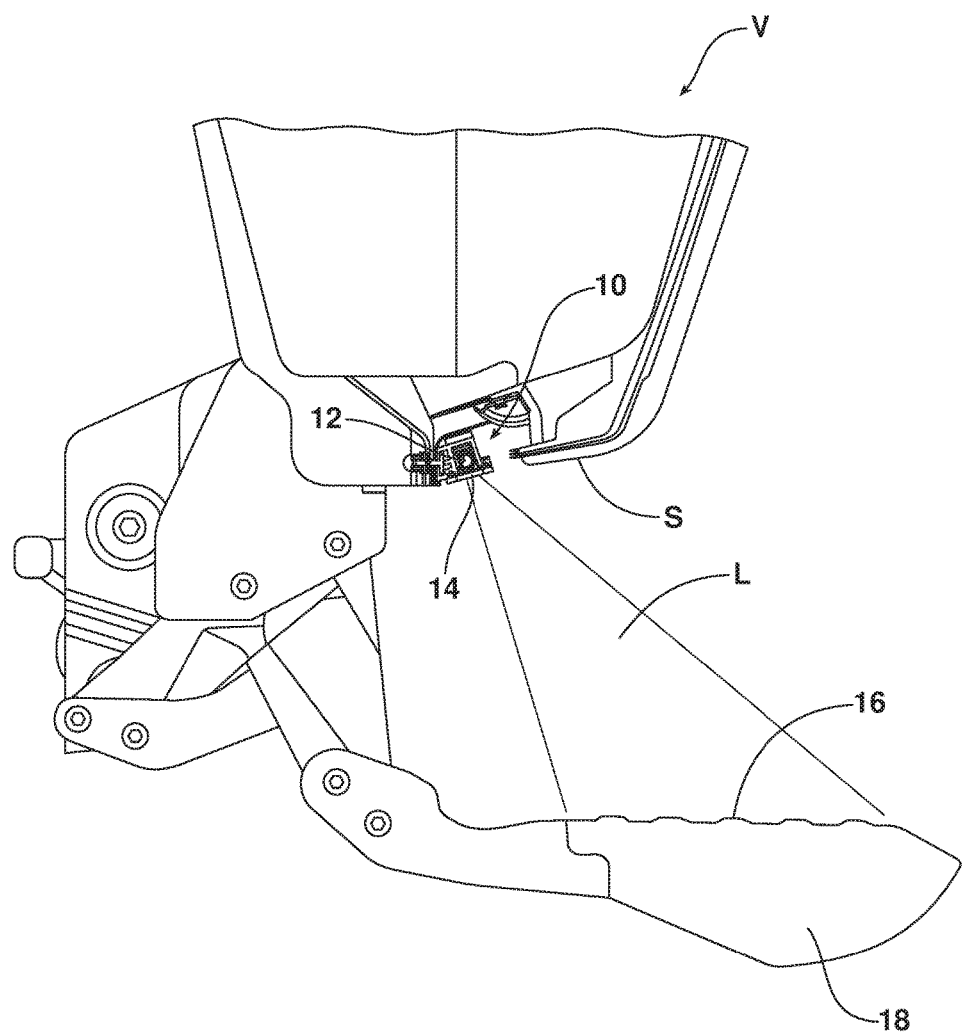
FIG. 2 is a schematic side elevational view illustrating the running board in the lowered, deployed position with light emitted from the first illumination element being directed down upon the foot pad surface of the running board.
Figure 3:
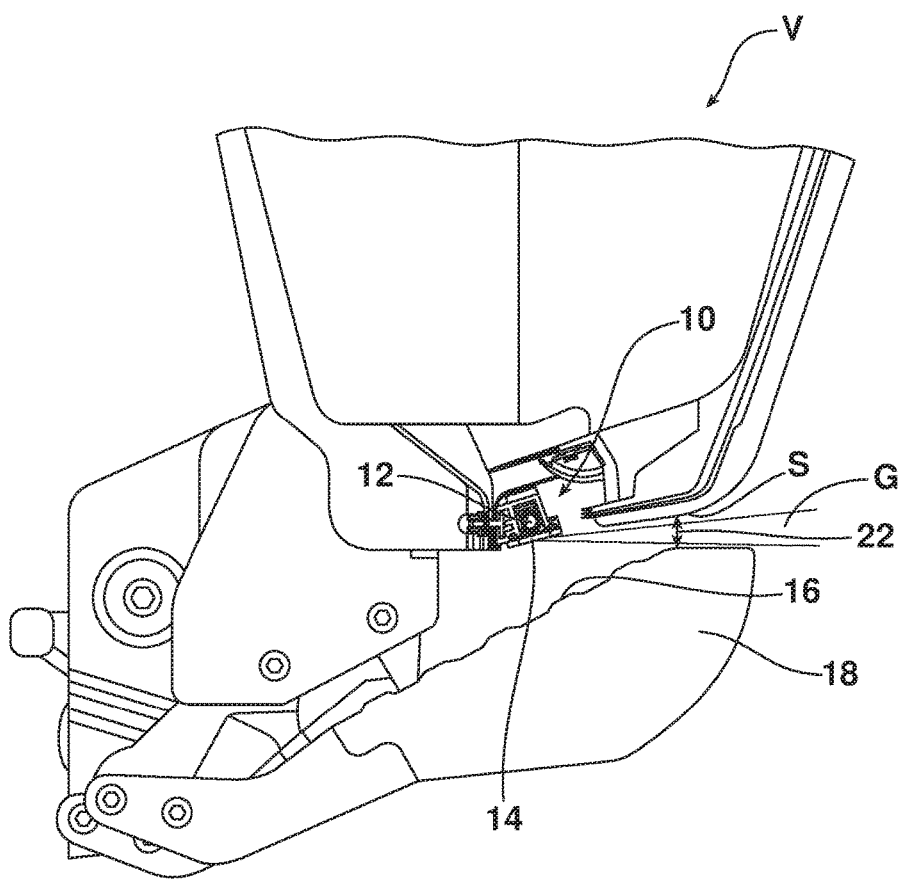
FIG. 3 is a view similar to FIG. 2 illustrating the running board in the raised, stowed position with a passive marker light glow emitted from the fluorescent coating on the lens of the first illumination element being directed through the gap between the bottom of the side sill and the top of the running board.

As will be appreciated from the following description, the optical lens 14 incorporates a fluorescent coating 20 that is charged or energized when light L from the first illumination element 12 is passed through the optical lens 14 onto the foot pad surface 16 of the running board 18 during a first time frame. This is typically done when the running board 18 is in the deployed position to assist in allowing one to enter the motor vehicle V such as illustrated in FIG. 2.

The energized fluorescent coating 20 then functions to emit a passive marker light glow G through a gap 22 between the running board 18 and the side sill S of the motor vehicle during a second time frame such as during vehicle operation when the running board 18 is in the stowed position (note FIG. 3) and the illumination element 12 is extinguished. In one particularly useful embodiment, the fluorescent coating 20 comprises an amber phosphor coating.

Figure 4:
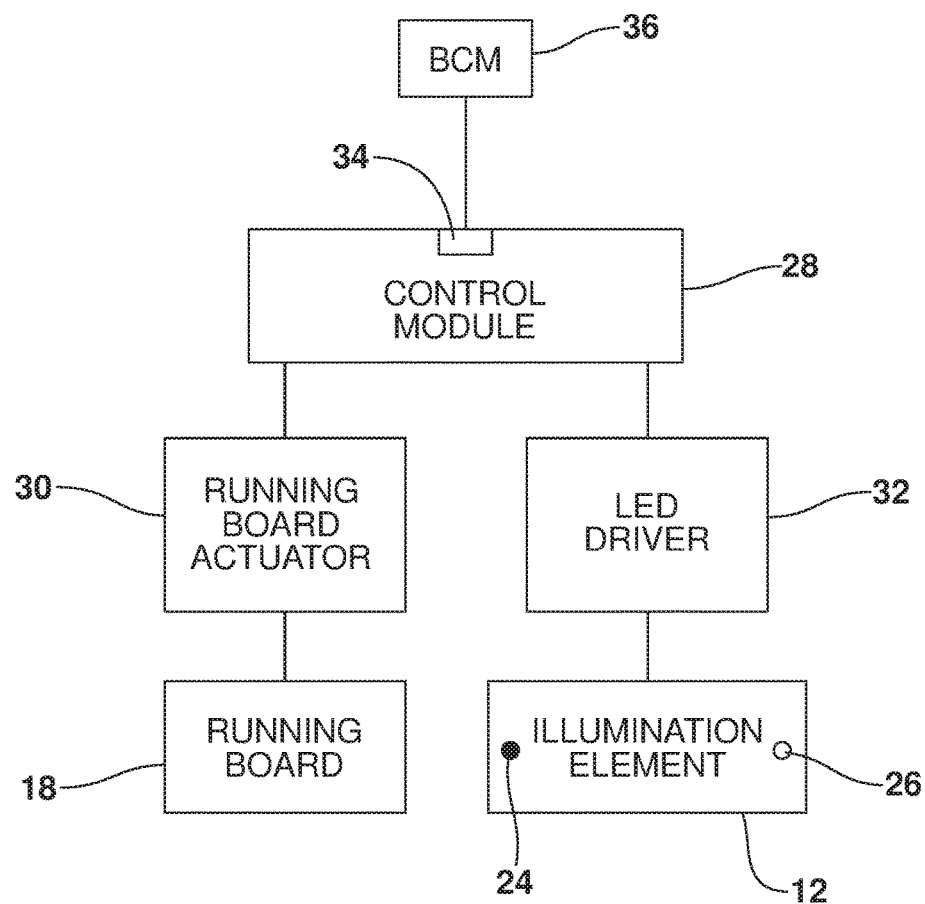
FIG. 4 is a schematic block diagram of the control circuit of the running board illumination system wherein the running board illumination system includes a single illumination element.

As best illustrated in FIGS. 1 and 4, the first illumination element 12 may comprise a light pipe having a first RGB LED 24 at a first end and a second RGB LED 26 at a second end.

The running board illumination system 10 also includes a control module 28 which may comprise, for example, a computing device such as a dedicated microprocessor or electronic control unit (ECU) operating in accordance with appropriate control software. The control module 28 is connected to a running board actuator 30 which displaces the running board 18 between the deployed and stowed positions illustrated, respectively, in FIGS. 2 and 3. Further, the control module 28 is connected to an LED driver 32 that drives or powers the first and second RGB LEDs 24, 26.

As further illustrated in FIG. 4, the control module 28 may include a data input 34 that may be connected by bus or other means to other control modules of the motor vehicle such as the body control module (BCM) 36. The BCM 36 performs a number of interior body electrically based functions including, for example, interior locking, remote key entry, interior light, exterior light, windshield wiper control and the like. In some embodiments, the BCM 36 may also function to control entertainment functions (e.g. radio, CD player and communications such as telephone and internet communications over a wireless network). In some embodiments, the BCM 36 is connected by a communication bus (not shown) to other control modules that provide one or more of these additional functions.

As indicated above, the control module 28 is configured to control the first illumination element 12. In one possible embodiment, the control module 28 is configured to operate the first illumination element as a redundant turn signal upon receiving a turn signal activation signal at the data input 34 from the BCM 36.

In some embodiments, the control module 28 is configured to operate the first illumination element 12 as a redundant emergency flasher when an emergency flasher activation signal is received at the data input 34 from the BCM 36.

In some embodiments, the control module 36 is configured to operate the first illumination element 12 as a panic mode strobe upon receiving a panic mode activation signal at the data input 34 from the BCM 36. Typically, such a signal is first received by the BCM 36 from a transceiver (not shown) on the motor vehicle when the motor vehicle operator presses a panic button provided on the motor vehicle key fob (also not shown) as is known in the art. Such a signal may be transmitted from the key fob to the transceiver connected to the BCM 36 by wireless radio technology. When operated in panic mode, the first illumination element 12 may function at five times normal brightness with the first RGB LED 24 and the second RGB LED 26 being alternately illuminated in back-and-forth fashion so as to draw the attention of others.

Still further, the control module 28 may be configured to operate the first illumination element 12 as a welcome light when an operator approaches the motor vehicle V. This is done when the BCM 36 provides an operator approach signal to the control module 28 through the data input 34. The approach of the operator may be detected in a manner known in the art such as when an identification signal from the key fob carried by the operator is received by the transceiver and confirmed to match the motor vehicle by the BCM 36.

Figure 5:
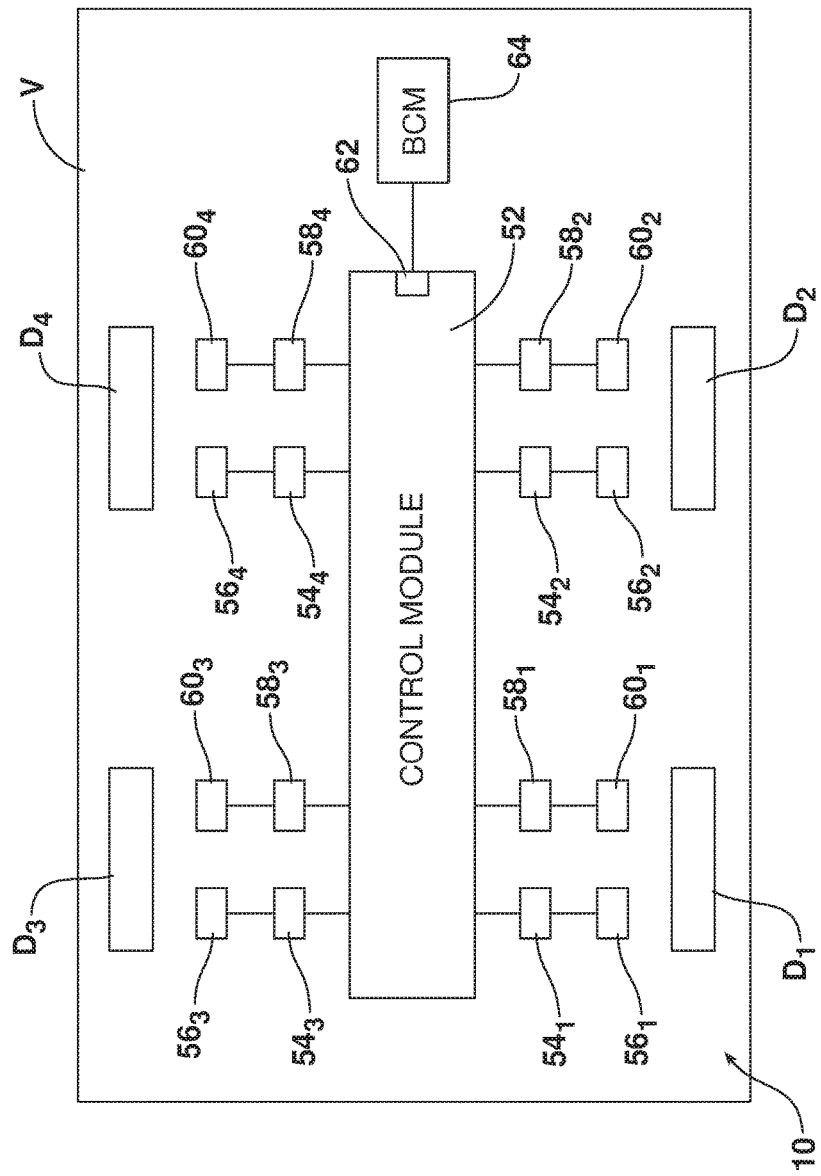
FIG. 5 is a schematic block diagram of the control circuit of the running board illumination system wherein the running board illumination system includes an illumination element at each of the four doors of the motor vehicle.

As best illustrated in FIG. 5, it should be appreciated that the running board illumination system 10 may include more than one illumination element 12. As illustrated in FIG. 5, the motor vehicle V includes a first door $D_1$, a second door $D_2$, a third door $D_3$, and a fourth door $D_4$. In the illustrated embodiment of FIG. 5, the running board illumination system 10 includes a control module 52 that is connected to four running board actuators $54_1$-$54_4$ which are connected to individual running boards $56_1$-$56_4$ provided beneath each door $D_1$-$D_4$. Thus, running board actuator 541 stows and deploys running board 561 beneath door $D_1$. Running board actuator $54_2$ stows and deploys running board $56_2$ beneath door $D_2$. Running board actuator $54_3$ stows and deploys running board $56_3$ beneath door $D_3$. Running board actuator $54_4$ stows and deploys running board $56_4$ beneath door $D_4$.

As should be further appreciated, control module 52 is also connected to LED drivers $58_1$-$58_4$ which in turn are connected to the illumination elements $60_1$-$60_4$. Thus, LED driver $58_1$ is connected to the first illumination element $60_1$ connected under the side sill S of the motor vehicle beneath door $D_1$. LED driver $58_2$ is connected to the second illumination element $60_2$ mounted behind the side sill S beneath door $D_2$. LED driver $58_3$ is connected to the third illumination element $60_3$ which is mounted behind the side sill S below the third door $D_3$. Finally, LED driver $58_4$ is connected to the fourth illumination element $60_4$ mounted behind the side sill S underneath the fourth door $D_4$.

As also illustrated in FIG. 5, the control module 52 includes a data input 62 for receiving data and signals from the BCM 64.

The first, second, third and fourth illumination elements $60_1$-$60_4$ in the FIG. 5 embodiment may each comprise a light pipe with a first RGB LED 24 at a first end a second RGB LED 26 at a second end in the manner of the first illumination element 12 as described above. The control module 52 of the FIG. 5 embodiment may be configured to operate any or all of the illumination elements $60_1$-$60_4$ as a redundant turn signal, as a redundant emergency flasher, as a panic mode strobe and/or as a welcome light just as previously described with respect to the FIG. 4 embodiment. Thus, the control module 52 is configured to operate the four illumination elements $60_1$-$60_4$ to provide a number of unique lighting effects (e.g. alternating colors from the front to the back of the motor vehicle, alternating colors around the motor vehicle, light fade, front-to-back of the motor vehicle or individually for each illumination element, dynamic police light effects using red and blue light from the front to the back of the motor vehicle, from the back to the front of the motor vehicle, around the motor vehicle, or of each illumination element individually.)

Consistent with the above description, a method is provided for illuminating a running board of a motor vehicle. That method includes the steps of directing light L emitted from a first illumination element 12 onto the running board 18 during a first time frame and directing a passive marker glow G onto the running board during a second time frame such as when the illumination element is extinguished (See FIGS. 2 and 3). More specifically, the light L is passed through a lens 14 which directs that light L onto the running board 18. A fluorescent coating 20 is provided on the lens 14. That coating 20 is charged with the light L emitted by the illumination element 12 during the first time frame. Thus, the coating 20 emits the passive glow G when the illumination element 12 is extinguished.

A control module 28 operates the illumination element 12. That control module 28 may be configured for operating the illumination element 12 as a redundant turn signal, as a redundant emergency flasher, as a panic mode strobe and/or as a welcome light when an operator approaches the motor vehicle V.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A running board illumination system for a motor vehicle, comprising:
   a first illumination element;
   an optical lens for directing light emitted by said first illumination element, said optical lens including a fluorescent coating to provide a passive marker light glow; and
   a control module configured to control said first illumination element wherein said first illumination element is a light pipe, having a first RGB LED at a first end and a second RGB LED at a second end, and said control module is configured to provide lighting effects from said first RGB LED and said second RGB LED.

2. The running board illumination system of claim 1, wherein said fluorescent coating is an amber phosphor.

3. The running board illumination system of claim 1, wherein said control module is further configured to operate said first illumination element as a redundant turn signal.

4. The running board illumination system of claim 1, wherein said control module is configured to operate said first illumination element as a redundant emergency flasher.

5. The running board illumination system of claim 1, wherein said control module is configured to operate said first illumination element as a panic mode strobe.

6. The running board illumination system of claim 1, wherein said control module is configured to operate said first illumination element as a welcome light when an operator approaches said motor vehicle.

7. A running board illumination system for a motor vehicle, comprising:
   a first illumination element provided adjacent a first door of said motor vehicle;
   an optical lens for directing light emitted by said first illumination element, said optical lens including a fluorescent coating to provide a passive marker light glow; and
   a second illumination element provided adjacent a second door of said motor vehicle.

8. The running board illumination system of claim 7, further including a third illumination element adjacent a third door of said motor vehicle and a fourth illumination element adjacent a fourth door of said motor vehicle.

9. The running board illumination system of claim 8, further including a control module configured to control said first illumination element, said second illumination element, said third illumination element and said fourth illumination element.

* * * * *